(12) United States Patent
Lubow

(10) Patent No.: US 7,108,186 B2
(45) Date of Patent: Sep. 19, 2006

(54) SYSTEM AND METHOD FOR VALIDATING A DIGITAL IMAGE AND CORRESPONDING DATA

(75) Inventor: Allen Lubow, New York, NY (US)

(73) Assignee: International Barcode Corporation, New York, NY (US)

( * ) Notice: Subject to any disclaimer, the term of this patent is extended or adjusted under 35 U.S.C. 154(b) by 0 days.

(21) Appl. No.: 10/497,636

(22) PCT Filed: Dec. 2, 2002

(86) PCT No.: PCT/US02/38558

§ 371 (c)(1),
(2), (4) Date: Nov. 3, 2004

(87) PCT Pub. No.: WO03/049007

PCT Pub. Date: Jun. 12, 2003

(65) Prior Publication Data

US 2005/0072846 A1   Apr. 7, 2005

Related U.S. Application Data

(60) Provisional application No. 60/334,570, filed on Nov. 30, 2001.

(51) Int. Cl.
*G06K 7/10* (2006.01)
(52) U.S. Cl. .............. 235/462.01; 235/462.09
(58) Field of Classification Search .......... 235/462.01, 235/492.09, 462.09, 454, 487
See application file for complete search history.

(56) References Cited

U.S. PATENT DOCUMENTS

| | | | |
|---|---|---|---|
| 4,590,366 A | * | 5/1986 | Rothfjell ............... 235/494 |
| 4,777,357 A | | 10/1988 | Harada et al. |
| 4,795,281 A | | 1/1989 | Ulinski, Sr. et al. |
| 4,811,408 A | * | 3/1989 | Goldman ............... 382/115 |
| 4,889,367 A | * | 12/1989 | Miller ................... 283/88 |
| 5,337,361 A | * | 8/1994 | Wang et al. ............ 380/51 |
| 5,522,623 A | | 6/1996 | Soules et al. |
| 5,563,401 A | | 10/1996 | Lemelson |
| 5,841,886 A | | 11/1998 | Rhoads |
| 6,032,861 A | | 3/2000 | Lemelson et al. |
| 6,100,804 A | | 8/2000 | Brady et al. |
| 6,318,636 B1 | | 11/2001 | Reynolds et al. |

(Continued)

FOREIGN PATENT DOCUMENTS

JP    9-231338    9/1997

OTHER PUBLICATIONS

International Search Report and Written Opinion mailed Oct. 24, 2005 in corresponding International Application No. PCT/US04/41064.

(Continued)

*Primary Examiner*—Daniel Stcyr
(74) *Attorney, Agent, or Firm*—Davidson Berquist Jackson & Gowdey, LLP

(57) ABSTRACT

To alert parties to an alteration to a bar code (20) or a corresponding digital image (18), for example a digital photograph which the bar code (20) partially overlaps, the bar code (20) includes information about the digital image (18). The bar code (20) partially overlaps and is integrated into the image (18). The bar code (20) and the part thereof in the image (18) are compared for required identity. By providing such an alert, the present invention makes it very difficult to alter, for example, an identification card, an use it for unauthorized purposes.

17 Claims, 4 Drawing Sheets

U.S. PATENT DOCUMENTS

| | | |
|---|---|---|
| 6,342,839 B1 | 1/2002 | Curkendall et al. |
| 6,354,494 B1 | 3/2002 | Marcus |
| 6,409,401 B1 | 6/2002 | Petteruti et al. |
| 6,415,978 B1 | 7/2002 | McAllister |
| 6,463,039 B1 | 10/2002 | Ricci et al. |
| 6,494,367 B1 | 12/2002 | Zacharias |
| 6,614,392 B1 | 9/2003 | Howard |
| 6,616,047 B1 | 9/2003 | Catan |
| 6,637,649 B1 | 10/2003 | Walsh |
| 6,646,554 B1 | 11/2003 | Goff et al. |
| 2001/0045460 A1 | 11/2001 | Reynolds et al. |
| 2005/0109846 A1 | 5/2005 | Lubow |
| 2005/0161512 A1* | 7/2005 | Jones et al. .......... 235/487 |
| 2005/0161515 A1 | 7/2005 | Lubow |

OTHER PUBLICATIONS

International Search Report mailed Apr. 10, 2003 in International Application No. PCT/US02/36371.
International Search Report mailed Apr. 8, 2003 in corresponding International Application No. PCT/US02/38558.
Office Action mailed Dec. 23, 2005 in corresponding European Application No. 02791236.9-2210.
Office Action mailed Jun. 3, 2005 in corresponding European Application No. 02791236.9-2210.
Supplemental European Search Report issued Mar. 8, 2005 in corresponding European Application No. 02791236.9-2210.

* cited by examiner

SYSTEM AND METHOD FOR VALIDATING A DIGITAL IMAGE AND CORRESPONDING DATA

CROSS-REFERENCE TO RELATED APPLICATION

This application is based upon and claims priority to U.S. provisional patent application Ser. No. 60/334,570 filed Nov. 30, 2001 and entitled SYSTEM AND METHOD FOR VALIDATING A DIGITAL IMAGE AND CORRESPONDING DATA, the entire contents of which is hereby incorporated by reference.

FIELD OF THE INVENTION

The present invention relates to a system and method to place information in a bar code and, more particularly, authenticates a security clearance.

BACKGROUND OF THE INVENTION

Forgeries of identification cards, drivers' licenses and other documents that confer authorization and/or security clearance continues to be a major concern. The availability of sophisticated technology enables forgers to create counterfeit copies of many different kinds of personal and professional materials more easily than ever before. No system currently is available to insure that a picture or more broadly, one type of information, and the corresponding information in another form in an underlying document, such as an identification card, belong together.

Since their inception, bar codes have been used to encode all sorts of information. Bar codes contain information in the bars and spaces that is interpreted by electronic devices, referred to herein as bar code reading devices. A bar code reading device, including, for example, a scanner, wand, optical scanner or verifier, reads the bars and spaces by measuring their widths and decoding the dimensions according to the rules of the particular bar code, known as its "symbology." A bar code symbology is a set of encoding algorithms that essentially provide the grammar for the production of the bar code pattern. As in written languages, bar code symbologies have rules of grammar that dictate how the pattern of bars and spaces are formed for any particular code data. Examples of recognized bar code symbologies include UCC/EAN 128, Codabar, Code 128, Code 39, Code 93, UPC-A, UPC-E, JAN-13, ITF, ISSN, ITF and ISBN. Typically, a bar code reading device determines the differences between the thickness of the bars and the thickness of the spaces by counting light and dark pulses of light as the reading device is drawn across the bars.

Among the most common bar code symbologies in the U.S. and Canada is the Universal Product Code (UPC-A). As shown in FIG. 1, a UPC-A bar code symbol's pattern of bars and spaces is a unit bar 10. Unit bar 10 is a narrow bar having a predetermined width for a bar code symbol at a given magnification. The dimensions of the bars and spaces in the symbol are exact multiples of the unit bar. Thus, double bar 12 in the symbol is twice as wide as unit bar 10, while triple bar 14 is three times as wide and quadruple bar 16 is four times as wide.

Each bar code symbol begins and ends with start and stop characters, referred to herein as frame bars. Frame bars are unique to the symbology involved and instruct a bar code reading device what symbology to expect when reading the symbol. The frame bars in the symbol shown in FIG. 1 are composed of unit bars 10.

For each bar code symbology, there are published specifications to provide instructions for those producing bar codes. ANSI standards are widely regarded as the accepted standard for each symbology. Bar code systems are issued with the instructions so that all participants will conform to the published standards. In order to measure how closely a bar code symbol meets these standards, electronic verifiers can be used.

Whether a bar code symbol can be read depends, in part, on the ability of a bar code reading device to measure the relative widths of the bars and spaces of a bar code. The ability of a bar code reader to discern the relative widths of the bars and spaces depends upon the contrast between the bars and spaces in a bar code. Most symbologies require at least a 50% contrast between the darken portion (i.e., the bars) and the light portion (i.e., the spaces). Without a contrast of at least 50% between the bars and spaces for many symbologies, a bar code may be unreadable.

Many forms of identification documents and the like comprise bar codes. However, using sophisticated graphic computer software, forgers can remove an image from an identification card, and, replace the image with one that does not represent the true owner of the card.

SUMMARY OF THE INVENTION

The present invention relates to a system and method which prevents modification to a digital image, a corresponding bar code and an underlying document, such as a personal identification card. In a preferred embodiment, numeric values, for example representing bits included in the digital image, are encrypted and encoded in the bar code. A sort of digital signature of the digital image is preferably encoded in the bar code.

The present invention is further directed to alert parties of an alteration to a bar code, a corresponding digital image, for example a digital photograph, or an underlying document, such as an identification card. By providing such an alert, the present invention makes it very difficult to alter, for example, an identification card, and use it for unauthorized purposes.

In accordance with the present invention, a RSS bar code is printed such that at least part of the bar code overlaps with a digital image and a portion overlaps with an underlying document, such as a personal identification card. The color characteristics of the digital image are preferably altered particularly in the region of the digital image overlapped by the bar code, in order to produce the same sequence of wide and narrow bars and spaces in the digital image as the overlapping bar code. The digital image, for example a scanned photograph or a digital photograph, and the corresponding RSS bar code are printed together on the identification card and are referenced together to confirm that the identification card, corresponding digital image and/or bar code have not been altered.

The present invention preferably ties together the digital image, the bar code and the underlying document to make them effectively inseparable. A security check alerts a person to a possible problem if the bar code is unreadable, or if a visual inspection of the digital image reveals that it is not related to the bar code. Additionally, the present invention employs encryption methods to further thwart potential counterfeiters. Therefore, the present invention assures that a digital image and corresponding data encoded in a bar code belong together.

BRIEF DESCRIPTION OF THE DRAWINGS

For the purposes of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which.

DETAILED DESCRIPTION OF EMBODIMENTS OF THE INVENTION

Figure 1:
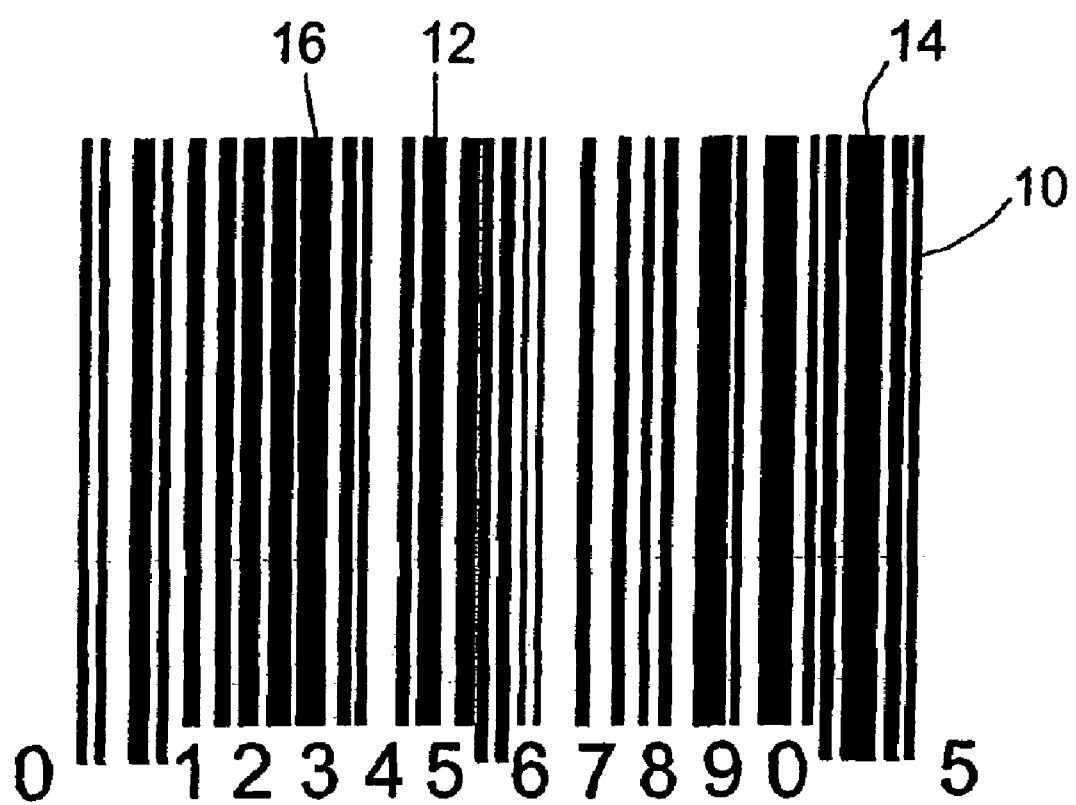
FIG. 1 shows a typical UPC bar code symbol.

In a preferred embodiment of the present invention, a security system is used by building or company security that is based on an identification card comprising a photograph and a RSS bar code. The RSS bar code contains information regarding the holder of the card, in addition to a unique ID number that is based upon the cardholder's photograph. The ID number is extracted electronically from the image, for example, by scanning the image and, particularly, the portion of the image overlapped by the bar code. The ID number is further extracted by a bar code reading device when the bar code is read. If the ID number retrieved from the image corresponds with the ID number retrieved from the bar code, then no alteration has occurred. The bar code, therefore, appears integrated with the underlying digital image. The present invention preferably preserves as much of the digital image as possible, while maintaining a readable bar code.

According to the principles of the present invention, modifying the bar code would render the bar code unreadable by a bar code scanner, or make it no longer related to the information of the digital image. Furthermore, altering the digital image or the bar code would be obvious to someone visually inspecting or digitally scanning the identification card. Therefore, if someone tampers with either the digital image, for example by replacing the image with a different image, or the bar code, for example by changing the bar code to contain different data, then the bar code and image will appear to be out of sync. Specifically, the bars and spaces will not appear to be integrated with the image.

In a preferred embodiment, a bar code overlaps with an image, such as a digital photograph. Sections of the bar code, for example, the bars, comprise a portion of the image. Moreover, the bar code is preferably encoded with information that represents the image, such that when the information is decoded by a bar code reading device, such as a scanner, the information confirms that the image corresponds with the bar code.

In accordance with the present invention, a photograph is taken with a digital camera, or scanned from a film photograph, to create a digital image. The digital photo-image is combined with the digital bar code image so that the two overlap. In the preferred embodiment, the bar code is imprinted on the digital photo-image, giving the bar code the color characteristics of the underlying digital image. The edges of the bar code are preferably sharpened, and the colors of the image are, to a predetermined degree (described in detail below), lightened or darkened depending upon whether a corresponding bar or space of the bar code is intersecting with the image.

The regions of the digital image that are to be darkened have cyan and black added to the digital picture elements ("pixels") within the overlapping regions. Those regions of the image that coincide with the spaces, known as the "quiet zone," of the bar code are lightened by reducing the values of cyan and black pixels.

Figure 2A:
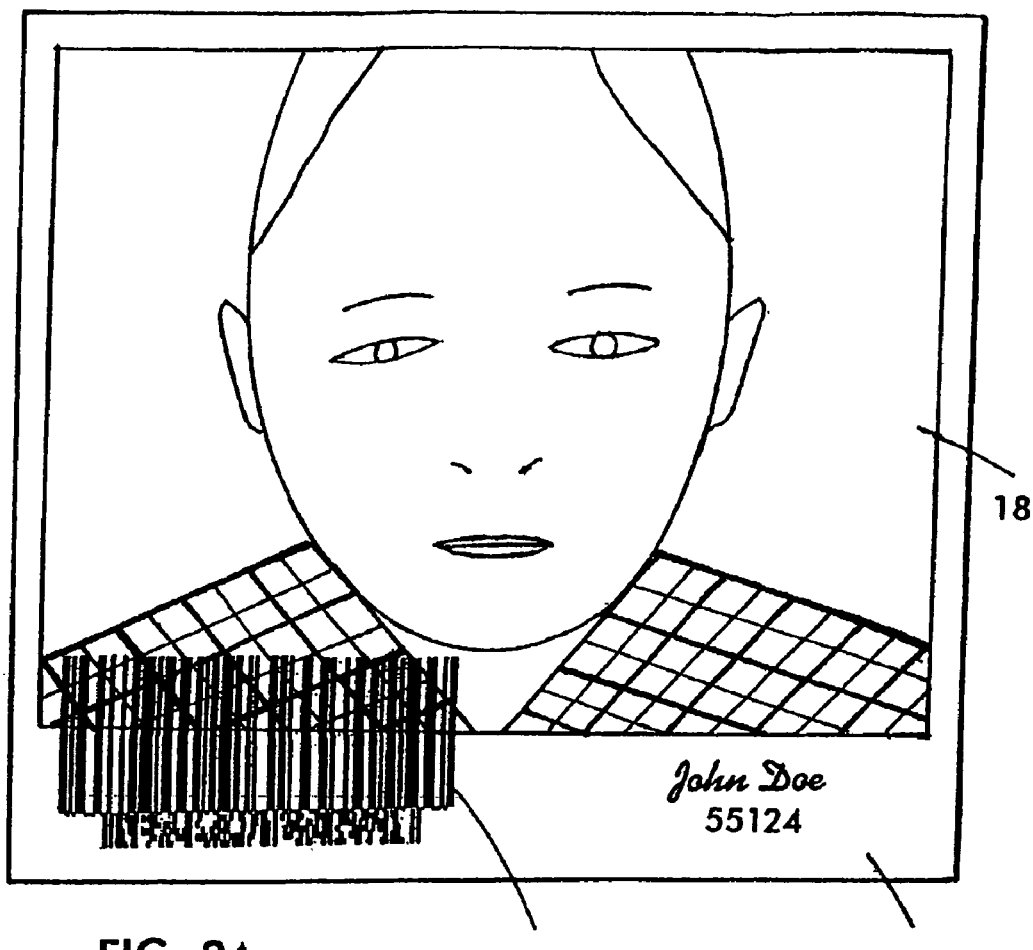
FIG. 2A illustrates a digital image and a overlapping bar code in accordance with the present invention.

FIG. 2A shows a digital image 18 of a person and a corresponding RSS bar code 20 that overlaps with a portion of the digital image 18. The bar code 20 preferably has encoded information that identifies the digital image 18. After the bar code 20 is read by bar code reading device, the information regarding the digital image 18 is extracted. Furthermore, the digital image 18 is scanned, and information retrieved from the image scan is compared with the information retrieved from the bar code. If the comparison reveals the two are the same, then the bar code 20 belongs with the digital image 18. Further, and as shown in FIG. 2A, the digital image 18 and bar code 20 are embedded in underlying document 22.

Figure 2B:
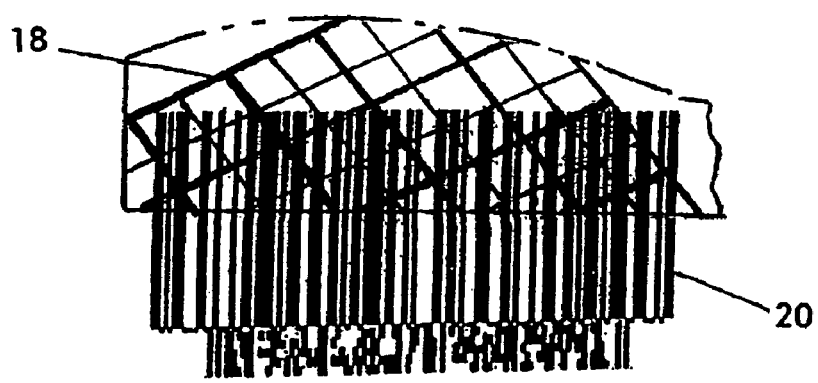
FIG. 2B shows an enlarged portion of FIG. 2A to illustrate the modification to pixels of a digital image in accordance with the present invention.

FIG. 2B shows an enlarged portion of part of the intersection of the digital image 18 and RSS bar code 20. As shown in FIG. 2B, portions of the digital image 18 can be determined by a visual inspection in the bars and spaces of the bar code 20. This enables someone who is viewing the digital image 18 and bar code 20 to determine that the two belong together.

More particularly, an image having cyan and black pixels that range between 1 and 256 bits are measured to determine the darkness of the pixels, and, if necessary, are modified to provide a readable bar code. In a preferred embodiment of the present invention, any pixel that has fewer than 128 bits is considered to be less than 50% gray, and, correspondingly, any pixel that has more than 128 bits is considered to be more than 50% gray. For example, the light pixels of an image and comprising the quiet zone of a bar code comprise 75 bits. In order to provide an adequate contrast between the dark regions and the quiet zone of the bar code and, therefore, to enable the bar code to be readable by a bar code reading device, the dark portions, or bars of the bar code, consist of pixels having at least 75 bits plus 128 bits, or 203 bits. The present invention preferably analyzes each pixel of the image comprising the quiet zone and the bars of the bar code, and, when necessary, increases the values of the cyan and black values, to at least 203 bits in the above example, in the portions comprising the bars of the bar code to assure adequate contrast between the bars and the quiet zone.

Moreover, the values of cyan and black pixels of the image corresponding with the quiet zone of the bar code are decreased after the present invention determines that an inadequate contrast exists between the bars and the quiet zone. For example, if all of the pixels in the image comprising bars of the bar code comprise 200 bits, then all of the spaces making up the quiet zone comprise 200 bits minus 128 bits, or 72 bits, to provide adequate contrast with the bars of the bar code.

As noted above, in order for a bar code to be readable by a bar code reading device, the values between the bars and spaces contrast by at least 50%. Therefore, for an image output in cyan, magenta, yellow and black ("CMYK") colors, the amount of cyan and black to be added to the regions of the image corresponding with the bars of a bar code is increased to provide at least a 50% contrast with the quiet zone, for example, at least 25% of their original value. Since bar code reading devices are typically unable to perceive magenta and yellow, only cyan and black pixels are darkened or lightened in a preferred embodiment of the present invention.

Such adjustments to pixels in portions of the image that correspond with bars and spaces of a bar code ensure that the image, as modified, will be similar enough with the original, unaltered image to be recognizable by a person upon visual inspection. The resulting image is preferably recognizable by a person viewing the digital image, and the bar code is readable by a bar code reading device.

In addition to providing a bar code image that is superimposed over a digital image and comprises pixels of the digital image, the present invention provides added layers of security to ensure that a bar code and a corresponding image belong together. More particularly, at least three pixel values that are included in the digital image are ascertained by the present invention and encoded in the bar code. For example, three coordinates (e.g., X,Y coordinates) of the digital image are identified and analyzed to determine the CMYK values of the pixels existing at the three coordinates. The CMYK values and their particular coordinates are preferably encoded in the bar code. Three pixel values are preferably used by the present invention to provide an effective cross-reference to confirm the authentication of the digital image. For example, as digital images are reproduced, uniform changes, such as scaling, and CMYK values, to the images occur. By relying upon three pixels and their corresponding coordinates, the present invention uses relative values to authenticate an image. As long as a digital image is uniformly affected during production or reproduction, the relative distances between the pixels and the relative differences between the pixels will be the same. The present invention preferably determines the relative differences of the distances between the pixels, and the relative differences of the pixel values in the produced (or reproduced) digital image. If the determination reveals the relative differences are the same for all the pixels, then the digital image is deemed to be unaltered. The more pixels and corresponding coordinates analyzed and encoded in the bar code by the present invention, the higher the likelihood of accuracy exists when authenticating a digital image.

Moreover, and to increase the effectiveness of the security provided of the present invention, the pixel values and corresponding coordinates are preferably encrypted in the bar code such that an unscrupulous forger would not be able to discern the respective values, even if he were able to extract the information encoded in the bar code.

Figure 3:
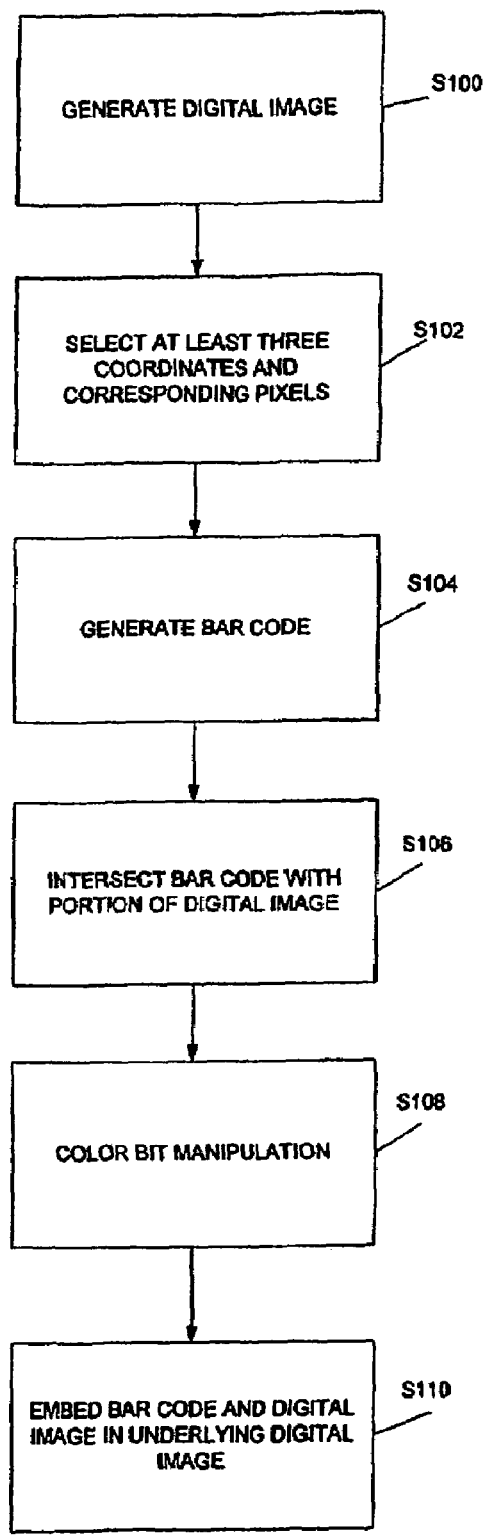
FIG. 3 shows a flow chart that identifies steps for combining a digital image, RSS bar code, and underlying document in accordance with the present invention.

FIG. 3 shows a flow chart that identifies steps for combining a digital image 18, RSS bar code 20, and underlying document in accordance with the present invention. As shown in step S100, a digital image is created and is used for providing identification of a person. The digital image shows, for example, a person's face who is associated with the underlying document, for example, an identification card. After the image is prepared, at least three coordinates, for example, X,Y coordinates, are selected from the digital image and the pixel values that correspond with the coordinates are determined (step S102). Thereafter, a bar code, for example a RSS bar code, is created that has information regarding the person associated with the underlying document, the respective X,Y coordinates, the corresponding pixel values encoded therein, and any additional information, for example information pertaining to the underlying document (step S104).

Continuing with the flow chart shown in FIG. 3, the bar code 20 is placed on the digital image 18 such that a portion of the bar code 20 overlaps with the digital image 18 (step S106). After a portion of the bar code 20 is placed over the digital image 18, then pixels that intersect the bars and spaces of the bar code 20 are preferably darkened and lightened in accordance with the processes described herein (step S108). After the pixels are adjusted to provide a suitable contrast between the bars and spaces of the bar code 20, the digital image 18 and bar code 20 are preferably embedded in the underlying document (step S110).

When a user presents his/her identification card, for example, to gain access to a restricted area, the present invention preferably reads the bar code and extracts the at least three coordinates in the image, and the corresponding CMYK values of the pixels at the coordinates. In a preferred embodiment of the present invention, the image is scanned by a scanning device, such as a flatbed scanner, and the CMYK values of the pixels at the respective coordinates are determined. If they match the values that are encoded in the bar code, then the person granting access to the restricted area receives confirmation that the bar code belongs to the image on the identification card.

Figure 4:
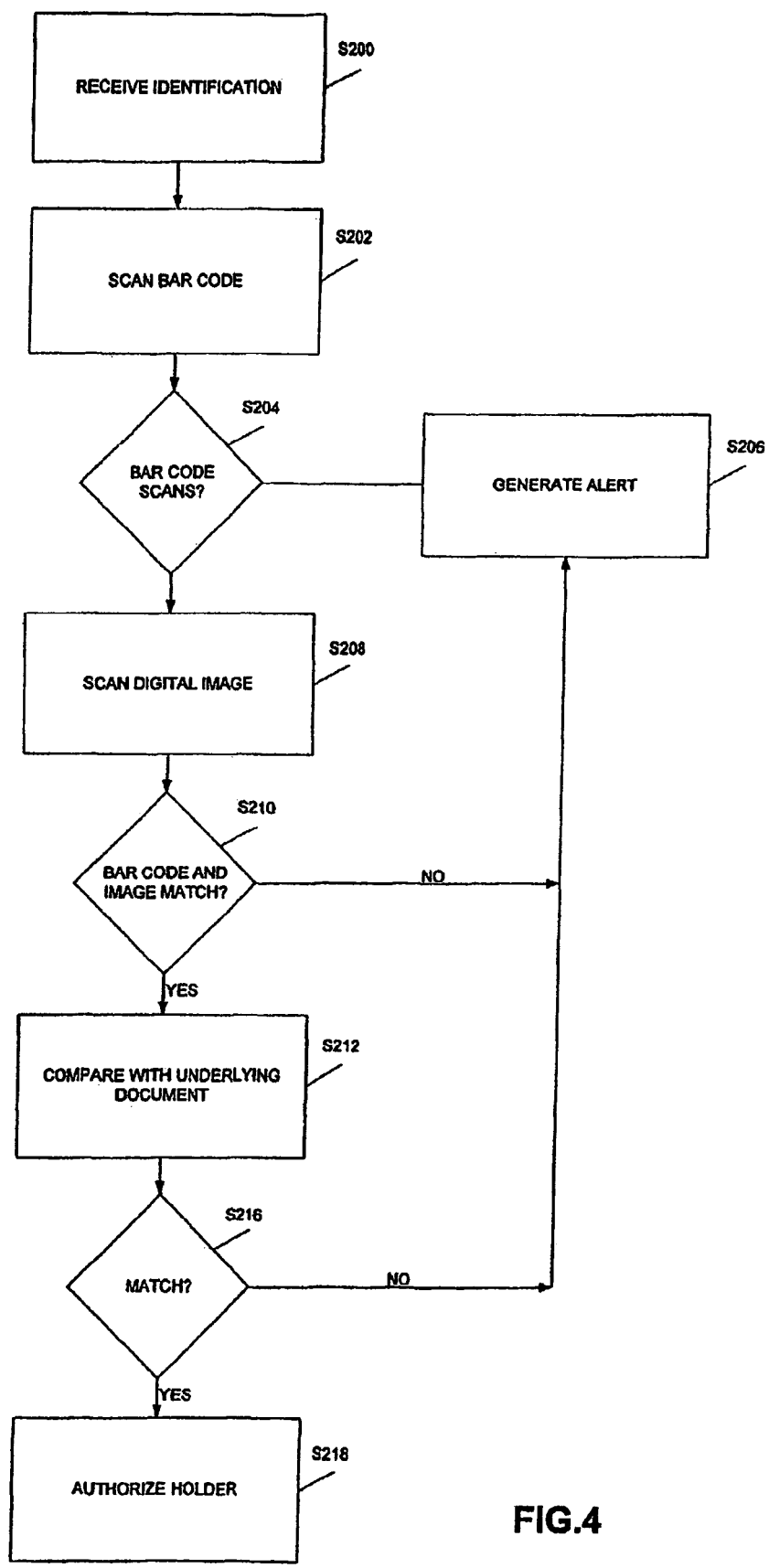
FIG. 4 shows a flow chart that identifies steps for determining whether an image, bar code, or underlying document, such as an identification card, created in accordance with one embodiment of the present invention has been altered.

FIG. 4 shows a flow chart that identifies steps for determining whether an image, bar code, or underlying document, such as an identification card, created in accordance with one embodiment of the present invention has been altered. Initially, a holder shows his identification card to a security person to gain access to a restricted area of a building (step S200). In step S202, a bar code reading device attempts to read the bar code included in the identification card. A determination is made whether the bar code can be read (step S204). If the bar code is unreadable, then a step is taken consistent with no current identification card being present, for example, an alert is generated and the holder is not allowed access to the restricted area (step S206).

Continuing with the flow chart in FIG. 4, if the bar code is successfully read by the bar code reading device in step S204, then, in step S208, the corresponding image in the identification card is scanned, for example by a flat bed scanner. A determination is, thereafter, made whether information in the scanned image corresponds with the information in the bar code (step S210). If the information does not correspond, then the process flows to step S206, and an alert is generated. If the information does correspond, then the information encoded in the bar code is compared with the information printed on the identification card (step S212). For example, an identifying number is imprinted on the identification card and compared with the value retrieved from the bar code. Thereafter, a determination is made whether the information in the bar code matches the printed information on the card (step S214). If the value extracted from the bar code does not match the identifier on the identification card, then the process flows to step S206 and an alert is generated and the user is not allowed to proceed to the restricted area. If the information in the bar code matches the information printed on the identification card, then the card is deemed to be unaltered, and the user is authorized to proceed (step S216).

The steps identified in the flow chart shown in FIG. 4 represent one embodiment of the present invention. Of course, those skilled in the art will realize that many variations on these steps are permissible without deviating from the principles of the present invention. For example, the order of the steps may vary, or the bar code can be scanned simultaneously with the scanning of the digital image.

Thus, even if someone who is intent on forging an identification card that is created using the system and method provided herein, for example, by replacing the image on the unaltered identification card with a new image, he would have to superimpose a bar code over the image and encode with all of the same information that was provided in the unaltered bar code. Even if the unscrupulous forger were able to produce a bar code out of a digital image and make it appear to seamlessly connect with the identification card, the information encoded in the bar code that represent values of pixels in the original image would not coincide with the new, altered digital image.

The present invention ensures that a picture and the accompanying information on an identification card or other document belong together. Information directed to the picture is encoded in a bar code, such as a RSS bar code with a two dimensional component. The bar code image is placed so that the a portion overlaps the photo image, and a portion overlaps the document and a portion overlaps the underlying document, for example the identification card. To bind the photo image, the bar code and the document together, tampering with the original identification becomes extremely difficult, if not impossible.

Although the present invention has been described in relation to particular embodiments thereof, many other variations and modifications and other uses will become apparent to those skilled in the art. Therefore, the present invention is not limited by the specific disclosure.

What is claimed is:

1. A method for generating a representation of an object shown in a digital image, the method comprising:
   generating said digital image, said digital image providing a visible identification of the object and containing image information, said image information regarding said digital image;
   generating a bar code symbol that contains at least some of said image information, said bar code symbol having at least one of a bar and a space intersecting at least a portion of said digital image;
   generating an underlying document including identifying information comprising at least said some information encoded in said bar code;
   embedding said digital image and said bar code in said underlying document; and
   determining color values of at least three picture elements in said digital image and determining corresponding coordinates of said at least three picture elements, and storing said color values and said coordinates in said bar code.

2. The method of claim 1, further comprising encrypting said information in said bar code.

3. The method of claim 1, wherein said digital image is a picture image comprised of picture elements.

4. A method for generating a representation of an object shown in a digital image, the method comprising:
   generating said digital image, said digital image providing a visible identification of the object and containing image information, said image information regarding said digital image;
   generating a bar code symbol that contains at least some of said image information, said bar code symbol having at least one of a bar and a space intersecting at least a portion of said digital image;
   modifying color characteristics of picture elements in said portion of said digital image to integrate said bar code with said portion of said digital image;
   generating an underlying document including identifying information comprising at least said some information encoded in said bar code; and
   embedding said digital image and said bar code in said underlying document such that said portion of said digital image and said bar code are printed together.

5. The method of claim 4, wherein said step of modifying includes determining picture elements that intersect bars of said bar code and picture elements that intersect spaces of said bar code.

6. The method of claim 5, further comprising darkening said picture elements that intersect said bars of said bar code, and lightening said picture elements that intersect said spaces of said bar code.

7. The method of claim 6, wherein said step of lightening and said step of darkening provides at least 50% contrast between said bars and said spaces.

8. The method of claim 6, wherein said step of darkening comprises adding cyan and black from said picture elements, and said step of lightening comprises subtracting cyan and black from said picture elements.

9. An apparatus for generating a representation of an object shown in a digital image, the apparatus comprising:
   a digital image generating module operable to generate a digital image providing a visible identification of said object and including image information regarding said digital image;
   a bar code generating module operable to generate a bar code symbol having at least one of a bar and a space intersecting a portion of said digital image, and the bar code symbol containing at least some of said image information;
   an underlying document generating module operable to generate an underlying document having at least some information encoded in said bar code printed thereon; and
   a combining module operable to embed said digital image and said bar code in said underlying document such tat said bar code overlaps at least a portion of said digital image and said underlying document; and
   a picture element gathering module operable to determine color values of at least three picture elements included in said digital image, operable to determine corresponding coordinates of said at least three picture elements, and to store said color values and said coordinates in said bar code.

10. The apparatus of claim 9, further comprising an encryption module operable to encrypt said information in said bar code.

11. The apparatus of claim 9, wherein said digital image is a picture image comprised of picture elements.

12. The apparatus of claim 9, wherein said bar code is at least one of a UCC/EAN 128, Codabar, Code 128, Code 39, Code93, UPC-A, UPC-E, JAN-13, ITF, ISSN, ITF and ISBN symbologies.

13. An apparatus for generating a representation of an object shown in a digital image, the apparatus comprising:
- a digital image generating module operable to generate a digital image providing a visible identification of said object and including image information regarding said digital image;
- a bar code generating module operable to generate a bar code symbol having at least one of a bar and a space intersecting a portion of said digital image, and the bar code symbol containing at least some of said image information;
- a color modifying module operable to modify color characteristics of picture elements in said portion of said digital image to integrate said bar code with said portion of said digital image;
- an underlying document generating module operable to generate an underlying document having at least some information encoded in said bar code printed thereon; and
- a combining module operable to embed said digital image and said bar code in said underlying document such that said bar code overlaps at least a portion of said digital image and said underlying document such that said at least a portion of said digital image and said bar code are printed together.

14. The apparatus of claim 13, wherein said color modifying module further determines picture elements that intersect bars of said bar code and picture elements that intersect spaces of said bar code.

15. The apparatus of claim 13, wherein said color modifying module further darkens said picture elements that intersect said at least one bars of said bar code, and lightens said picture elements that intersect said spaces of said bar code.

16. The apparatus of claim 15, wherein said color modifying module provides at least 50% contrast between said bars and said spaces.

17. The apparatus of claim 15, wherein said color modifying module darkens said picture elements by adding cyan and black to said picture elements, and lightens said picture elements by subtracting cyan and black from said picture elements.

* * * * *